United States Patent
Sandgren et al.

(10) Patent No.: US 8,494,841 B2
(45) Date of Patent: Jul. 23, 2013

(54) COMMON SCENE BASED CONFERENCE SYSTEM

(75) Inventors: Patrik Sandgren, Sundbyberg (SE); Anders Eriksson, Uppsala (SE); Tommy Falk, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 307 days.

(21) Appl. No.: 13/122,861

(22) PCT Filed: Oct. 9, 2008

(86) PCT No.: PCT/EP2008/063536
§ 371 (c)(1), (2), (4) Date: Apr. 6, 2011

(87) PCT Pub. No.: WO2010/040408
PCT Pub. Date: Apr. 15, 2010

(65) Prior Publication Data
US 2011/0196682 A1 Aug. 11, 2011

(51) Int. Cl.
*G10L 19/00* (2006.01)
*H04M 3/42* (2006.01)

(52) U.S. Cl.
USPC .............. 704/201; 704/200; 379/202.01

(58) Field of Classification Search
USPC .......... 704/200–201, 270–504; 379/93.21, 379/158, 202.01
See application file for complete search history.

(56) References Cited

U.S. PATENT DOCUMENTS

| | | | |
|---|---|---|---|
| 7,245,710 B1 * | 7/2007 | Hughes | 379/202.01 |
| 7,724,885 B2 * | 5/2010 | Jarske et al. | 379/202.01 |
| 7,933,226 B2 * | 4/2011 | Woodruff et al. | 370/260 |
| 2002/0097857 A1 * | 7/2002 | Kwan | 379/202.01 |
| 2003/0081115 A1 * | 5/2003 | Curry et al. | 348/14.12 |
| 2003/0216178 A1 * | 11/2003 | Danieli et al. | 463/35 |
| 2008/0144794 A1 * | 6/2008 | Gardner | 379/202.01 |
| 2008/0260131 A1 * | 10/2008 | Akesson | 379/202.01 |
| 2010/0215164 A1 * | 8/2010 | Sandgren et al. | 379/202.01 |

FOREIGN PATENT DOCUMENTS

| | | |
|---|---|---|
| EP | 0617537 A1 | 9/1994 |
| EP | 1868363 A1 | 12/2007 |
| JP | 60010958 A | 1/1985 |
| WO | 2007/006856 A1 | 1/2007 |

* cited by examiner

*Primary Examiner* — Douglas Godbold
(74) *Attorney, Agent, or Firm* — Coats & Bennett, P.L.L.C.

(57) ABSTRACT

Conference bridge (1) for managing an audio scene comprising two or more participants, the conference bridge comprising a mixer (2) and several user channels (3a, 3b, 3N). The conference bridge is arranged to continuously create a 3D positional audio environment signal for each participant as a listening participant, by rendering the speech of each participant as a 3D positioned virtual sound source and excluding the speech of the listening participant, and to distribute each created 3D positional audio environment signal to the corresponding listening participant. Further, the conference bridge is arranged to place the virtual sound source corresponding to each participant at the same spatial position relative the listening participant in every created 3D positional audio environment.

12 Claims, 17 Drawing Sheets

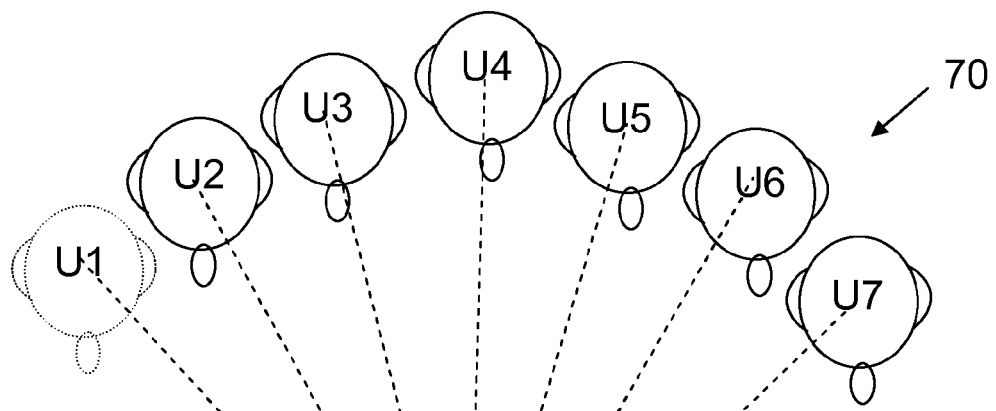
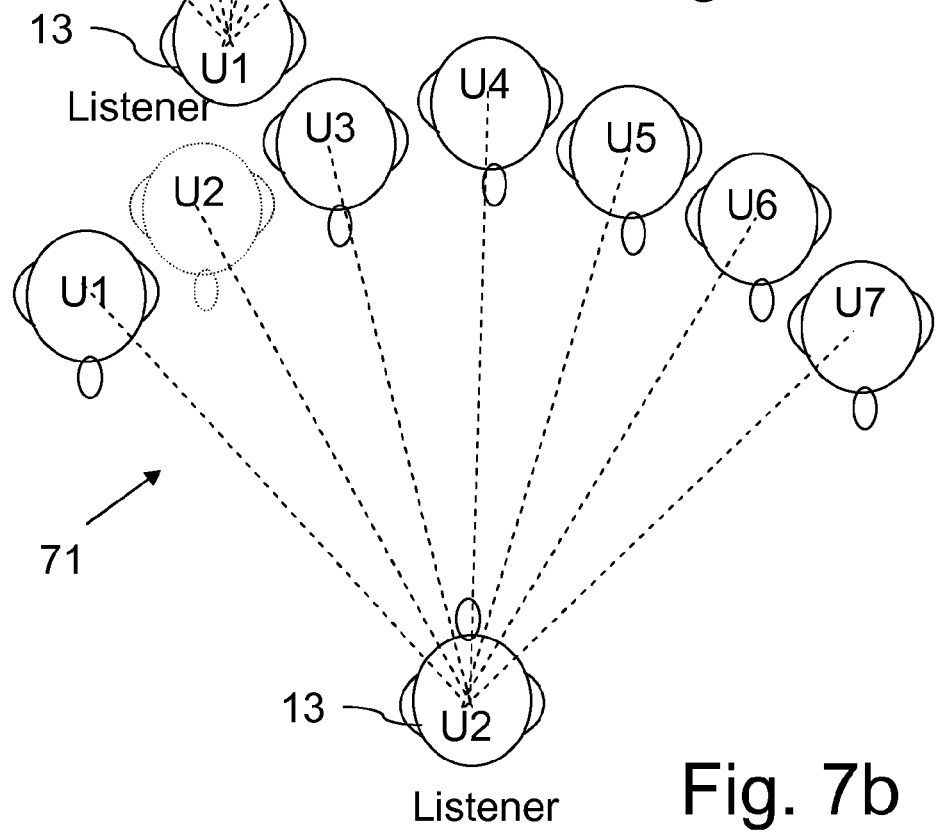
Fig. 7a
Fig. 7b

COMMON SCENE BASED CONFERENCE SYSTEM

TECHNICAL FIELD

The present invention relates to a method for a conference bridge, and to a conference bridge, in particular for a teleconference.

BACKGROUND

In a conventional face-to-face meeting, the participants are normally located around a table and are capable of turning their heads towards a speaking participant, in order to see the speaking participant and to maximize the correlation of the speech reaching respective ear, which will maximize the signal-to-noise ratio.

When more than one person is talking at the same time, a human listener is able to separate the speech from the different sound sources, based on the spatial distribution of the sound, and may concentrate the hearing to a specific person. This ability is commonly referred to as the "cocktail party effect".

However, in a conventional teleconference system, a mono-microphone will capture the speech in each of the different participating rooms, and the speech signals will be added and returned to the participating rooms through loudspeakers or headphones. Thus, in a virtual meeting, a listener may have difficulties to identify a speaking participant, and to distinguish an individual speaking participant when several participants are talking at the same time, since all the participants will appear to have the same spatial position relative the listening participant, i.e. the position of the loudspeaker.

To add video to the teleconference will enable the participants to see who is talking, but the problem to distinguish an individual speaking participant, when several of the participants are talking simultaneously, will remain. However, using three dimensional (3D) positional audio will solve this problem, and enable a participant to perceive the sound as in the real world, i.e. to "hear" the direction and the distance to a sound source. When 3D positional audio is used in a teleconference, a virtual room is reproduced with each of the participants located at a different virtual position, by a rendering of the speech of each participant as a 3D positioned virtual sound source.

FIG. 1 illustrates an exemplary conventional 3D positional audio system comprising a conference bridge 1, provided with a mixer 2 and a number of user channels 3, to which the participants of a teleconference is able to connect with different types of user terminals 4a, 4b, 4c. The conference bridge will mix the audio signals depending on the capabilities of the user terminals and their connection and a virtual room can be created, either centrally in the conference bridge or locally in the user terminals. Further, the conference bridge may communicate control data, including positional information and source identification, in addition to the audio.

In local rendering, the main task of the conference bridge is to decide which participants' speech signals that should be redirected to which local rendering user terminals, i.e. the encoded speech signals of all the participants or of only a few actively speaking participants, and the control of the virtual room, as well as the 3D positional audio rendering will be performed in the user terminal of each participant. If no transcoding is needed in the conference bridge, i.e. all the user terminals support the others' codec formats, the function of the conference bridge is computationally inexpensive, since the conference bridge only has to redirect the incoming bit-streams and not perform any encoding or audio rendering of the 3D positional audio environments.

However, in a conventional central rendering, the conference bridge will handle basically everything, including audio processing, such as noise suppression and sound level adjustment of the input signals, the rendering of the 3D positional audio environments, as well as the encoding of the created 3D positional audio environment signals. The user terminal of the participants will only decode each respective encoded signal, and possibly present a GUI (Graphical User Interface) showing the simulated virtual room. For each participating user terminal, the conference bridge will create a virtual 3D positional audio environment, which requires 3D audio rendering of the incoming speech signals from all the participants. Since a unique 3D positional audio environment signal is created for each participant as a listening participant, the number of output signals to encode will correspond to the number of participants.

The conventional positioning of the participants in a virtual room, i.e. a 3D audio environment 20, is evenly spaced around a round table, as illustrated in FIG. 2, in which the dashed lines reflect the directions of the speech from respective participant, indicated by U2 . . . up to U8, to a listening participant, indicated by U1.

The conference bridge will perform a 3D positional audio rendering of the speech signals in order to simulate the relative positions of the speaking participant with respect to a listening participant. Conventionally, the relative position of a certain participant as a speaking participant with respect to a listening participant will be different for all the participants, but the absolute position will be the same, similarly as in a non-virtual meeting.

The patent application PCT/SE2007/050344 describes enhanced methods for positioning the different participants in a virtual room, in order to improve the experience of a virtual meeting. This includes placing the participants on an arc relative a listening participant in a 3D positional audio environment created for the listening participant, and to adaptively change the positions in order to achieve symmetry, or in order to spatially separate the active talkers. To position the virtual sound sources corresponding to each participant on an arc is advantageous, since the distances to all other participants will be equal, the maximum angles to the left and right will become smaller, and the sound will be more pleasant. FIG. 6a illustrates a round-table 3D positional audio environment 60, including seven participants, with a listening position 13 for the listening participant, and the FIG. 6b shows this round table-environment 60 transformed into an arc environment 61.

A problem with the existing solutions is that central rendering is computationally expensive, since the conference bridge not only has to process the input signal from each participant, e.g. perform decoding, noise suppression and sound level adjustment, but also has to create an individual virtual 3D positional audio environment for each participant as a listening participant. Further, in order to simulate a virtual room, involving a spatial positioning of the participants with 3D audio rendering, the speech signals may have to be re-sampled to a different sampling rate, depending on the type of the user terminals. Both the re-sampling and the 3D audio rendering are costly tasks, and since a unique individual 3D positional audio environment is created for each participant as a listener, and each participant is included in the 3D positional audio environments for all the other participants, these costs will grow rapidly with an increasing number of participants.

When the audio signal simulating the 3D positional audio environment has been rendered, the signal has to be encoded before being transmitted to the user terminal of a participant. Normally, the rendered 3D positional audio environment is represented by a stereo signal, which means that a stereo codec is required for the encoding. The encoding of a stereo signal is an expensive task in terms of computational complexity, and since a unique individual 3D positional audio environment is rendered for each participant as a listener, the complexity may be very high, depending on the number of participants. Further, since the number of required encoders will correspond to the number of rendered individual 3D positional audio environments, the computational complexity will grow rapidly with an increasing number of participants.

SUMMARY

The object of the present invention is to address the problem outlined above, and this object and others are achieved by the method and arrangement according to the independent claims, and by the embodiments according to the dependent claims.

One or more embodiments herein relate to placing the virtual sound sources, corresponding to each participant, at the same spatial position relative the listening participant in every created 3D positional audio environment. This will reduce the computational complexity of the rendering and encoding, and enable a large number of participants to be supported at a low computational cost.

A first aspect of this invention provides a method for a conference bridge of managing an audio scene comprising two or more participants. The method continuously creates a 3D positional audio environment signal for each participant as a listening participant, by rendering the speech of each participant as a 3D positioned virtual sound source, excluding the speech of the listening participant, and continuously distributes each created 3D positional audio environment signal to the corresponding listening participant. The conference bridge places the virtual sound source corresponding to each participant at the same spatial position relative the listening participant in every created 3D positional audio environment.

The speaking participants may be detected continuously by voice detection of the input signals from each participant, and the conference bridge may render an individual 3D positioned audio environment signal for each speaking participant, and a common 3D positional audio environment signal for all non-speaking participants.

The virtual sound sources of a 3D positional audio environment signal may be placed to form an arc-shape, and a predetermined maximum number of speaking participants may be selected from said detected speaking participants by a detection of the activity level.

Only the speech from said selected speaking participants may be rendered as 3D positioned virtual sound sources, as well as re-sampled, if a re-sampling to a different sampling rate is required.

Each of said rendered individual 3D positional audio environment signals may be encoded separately, and said common 3D positional audio environment signal for the non-speaking participants may be encoded only once for each codec, the resulting bit-streams being distributed to the corresponding non-speaking participants.

The number of participants may be determined, and if said number does not exceed the number of available encoders, then an individual 3D positional audio environment signal may be rendered for every participant. Further, the virtual spatial positions in the 3D positioned audio environment may be adjusted to be symmetric relative the listening participant.

The initial state of an encoder may be set depending on whether the participant is a speaking participant, a non-speaking participant, or a new participant.

A second aspect of this invention provides a conference bridge for managing an audio scene comprising two or more participants, the conference bridge comprising a mixer and a number of user channels. The conference bridge is arranged to continuously create a 3D positional audio environment signal for each participant as a listening participant, by rendering the speech of each participant as a 3D positioned virtual sound source and excluding the speech of the listening participant, and to continuously distribute each 3D positional audio environment signal to the corresponding listening participant. The mixer is arranged to place the virtual sound source corresponding to each speaking participant at the same spatial position relative the listening participant in every 3D positional audio environment signal.

The mixer may further comprise a voice detector connected to each user channel for detecting the speaking participants, and a mixing control unit and a number of individual mixing units for rendering an individual 3D positioned audio environment signal for each speaking participant, and a common mixing unit for rendering a common 3D positional audio environment signal for all non-speaking participants.

BRIEF DESCRIPTION OF THE DRAWINGS

The present invention will now be described in more detail, and with reference to the accompanying drawings, in which:

The FIG. 1 illustrates a conference bridge connected to different types of user terminals;

Figure 2:
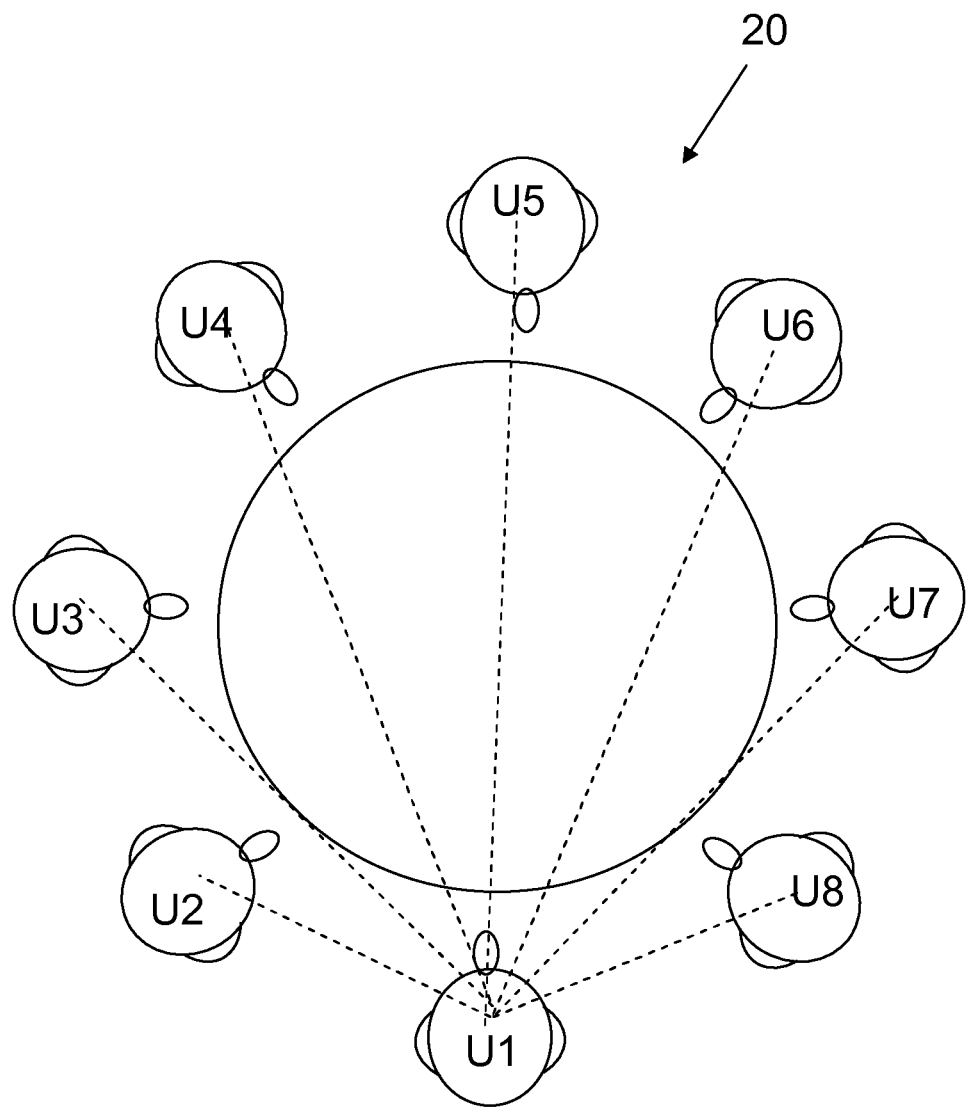
Figure 3A:
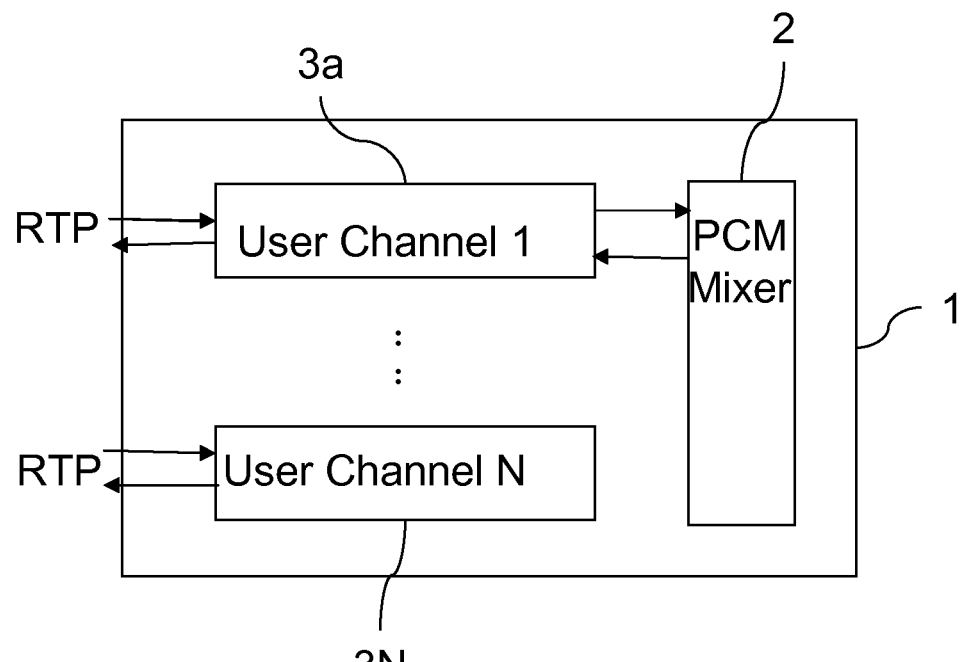
Figure 3B:
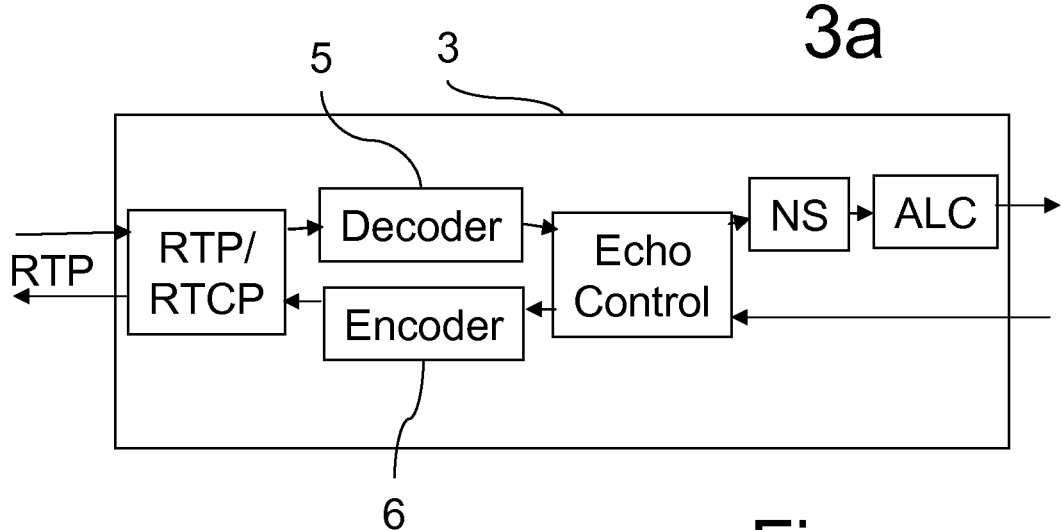
Figure 4:
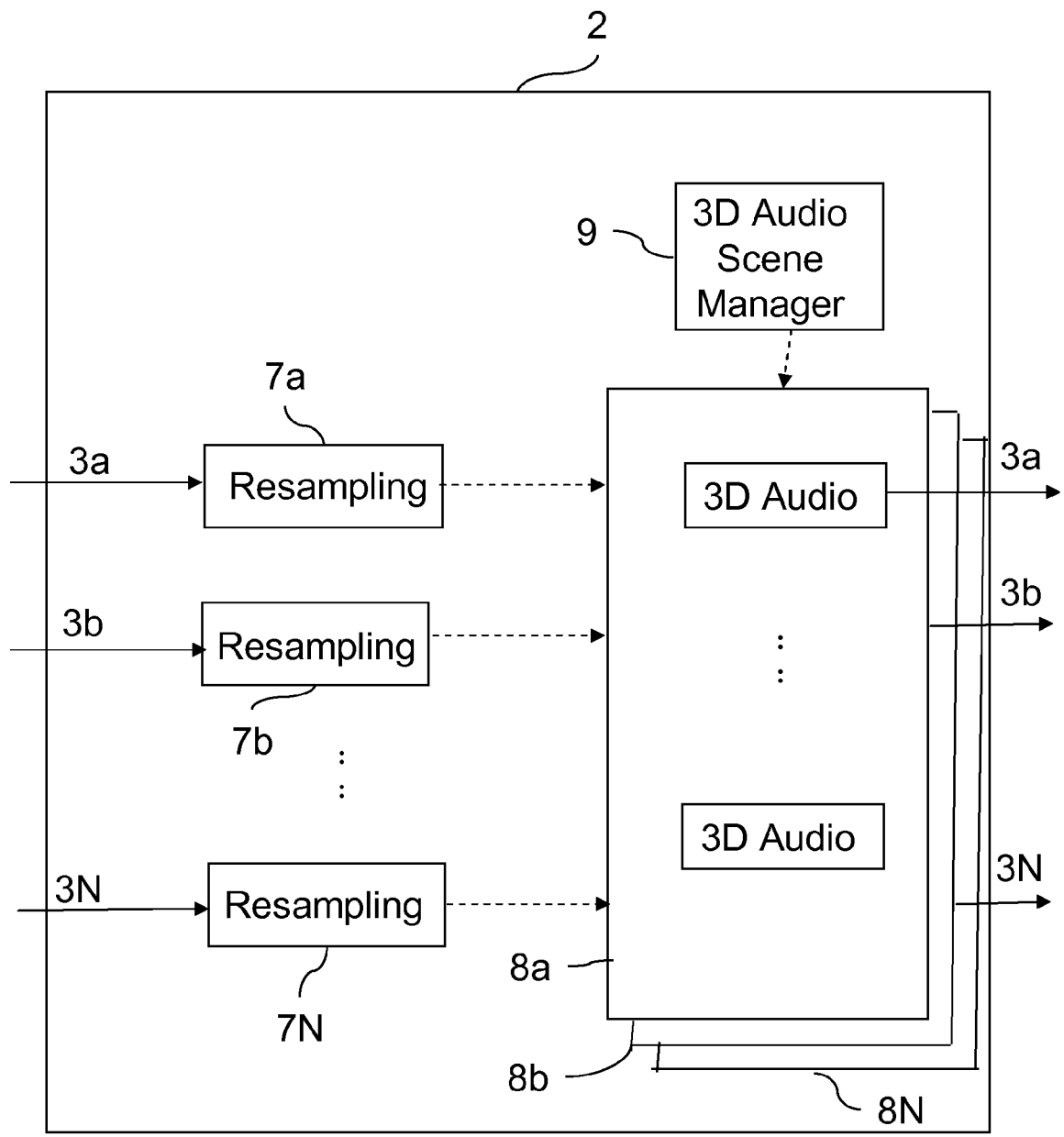
Figure 5:
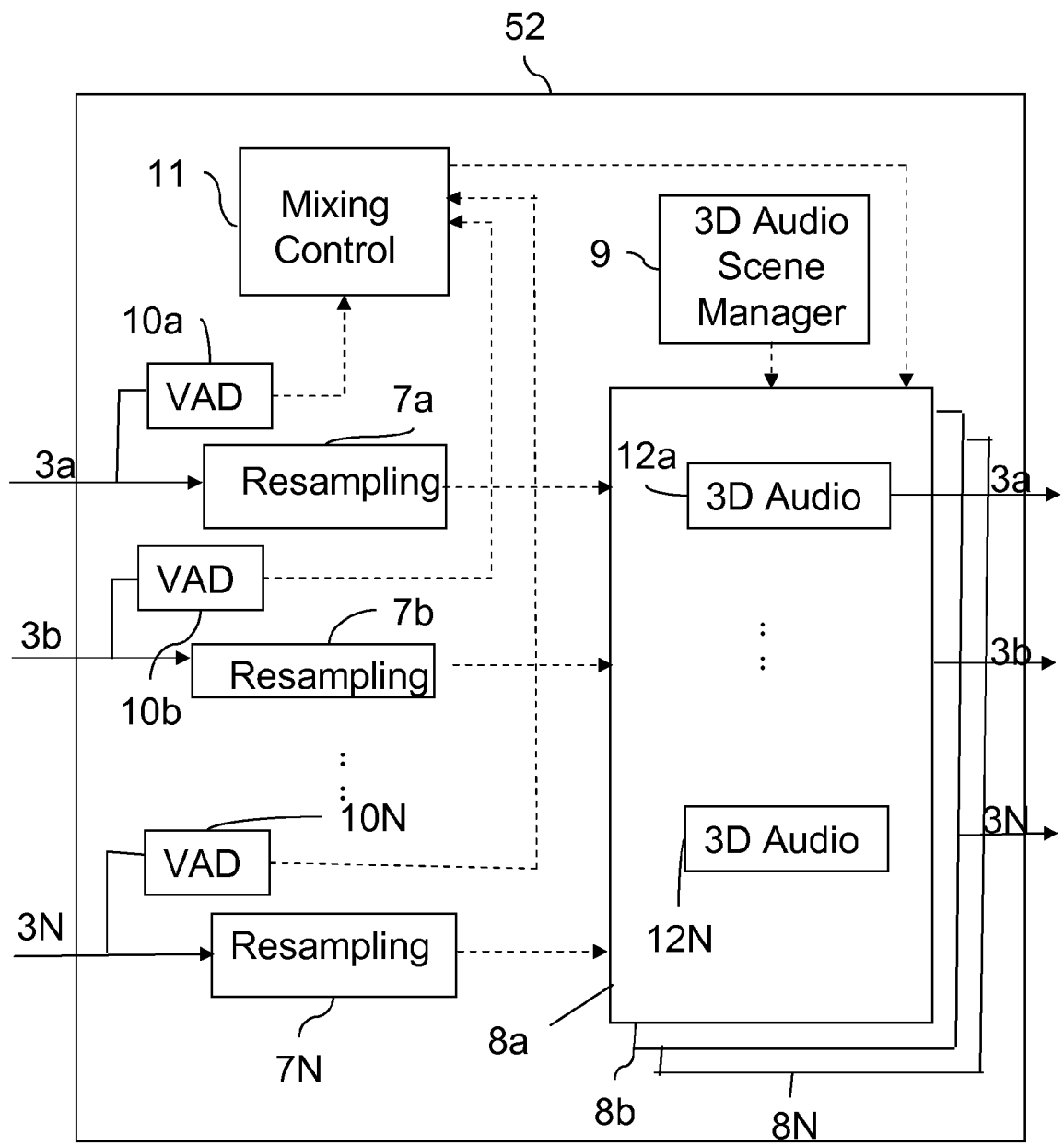
Figure 6A:
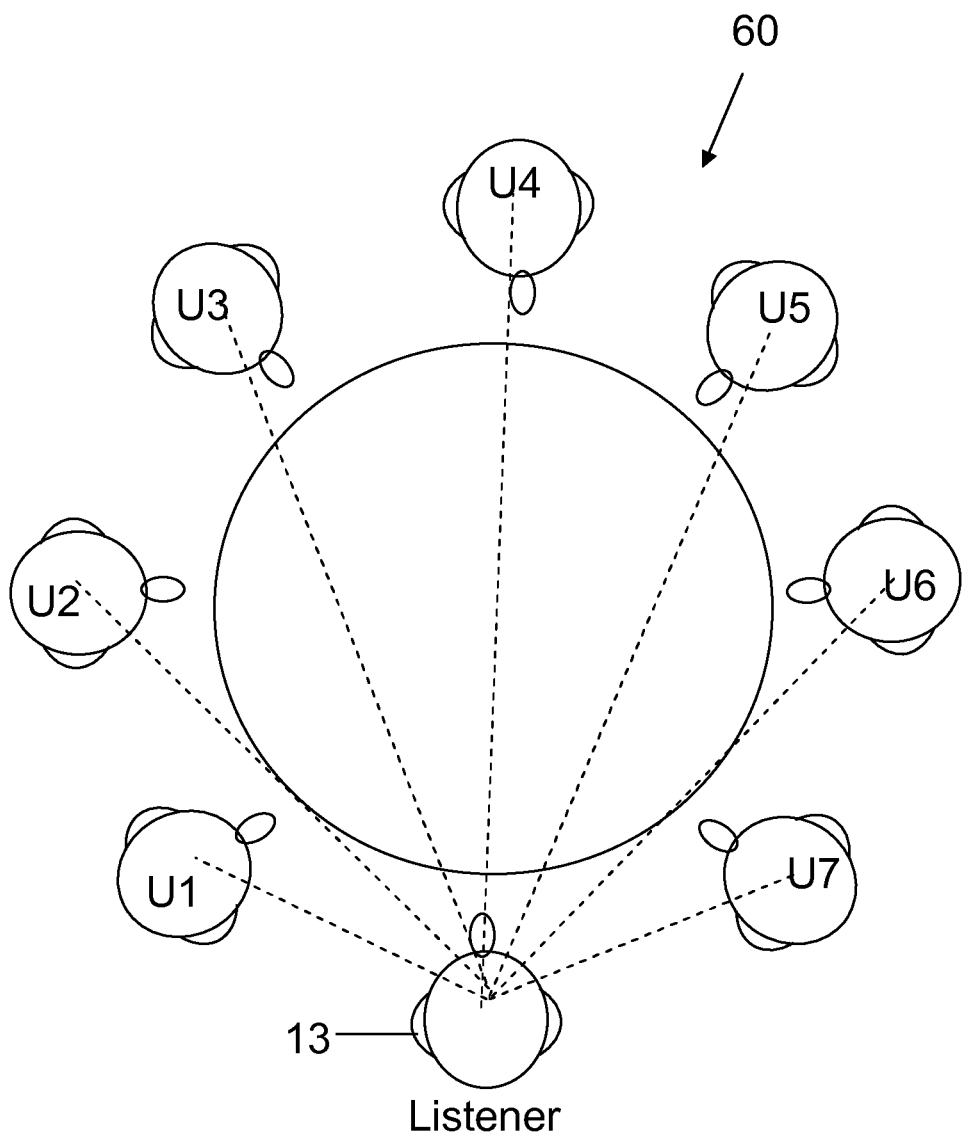
Figure 6B:
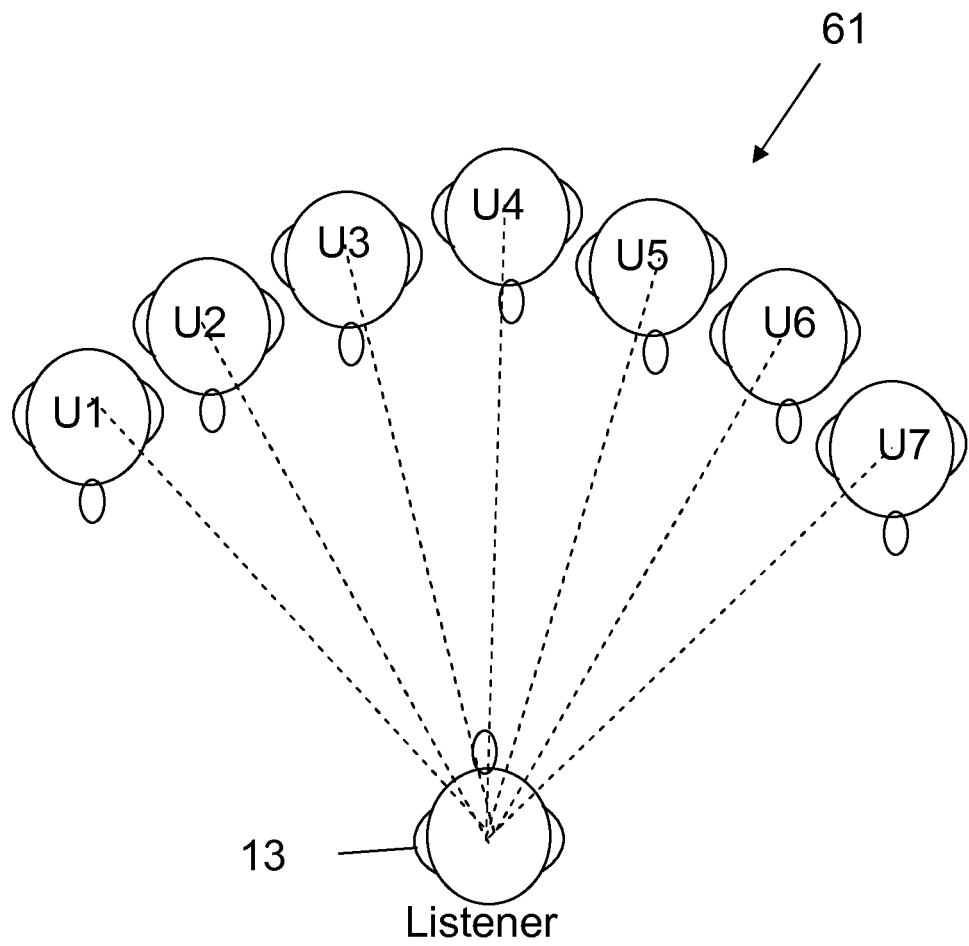

The FIG. 2 illustrates a conventional 3D positional audio environment;

The FIG. 3a shows a conference bridge, and FIG. 3b shows a user channel;

The FIG. 4 illustrates a conventional mixer of a conference bridge;

The FIG. 5 illustrates an exemplary mixer according to an embodiment of this invention;

The FIG. 6a illustrates schematically a round-table 3D positional audio environment created for a listening participant;

The FIG. 6b illustrates the 3D positional audio environment in 6a transformed into an arc-shaped environment;

The FIG. 7a illustrates the audio environment created for U1 as a listening participant, and FIG. 7b illustrates the audio environment created for U2 as a listening participant.

Figure 9A:
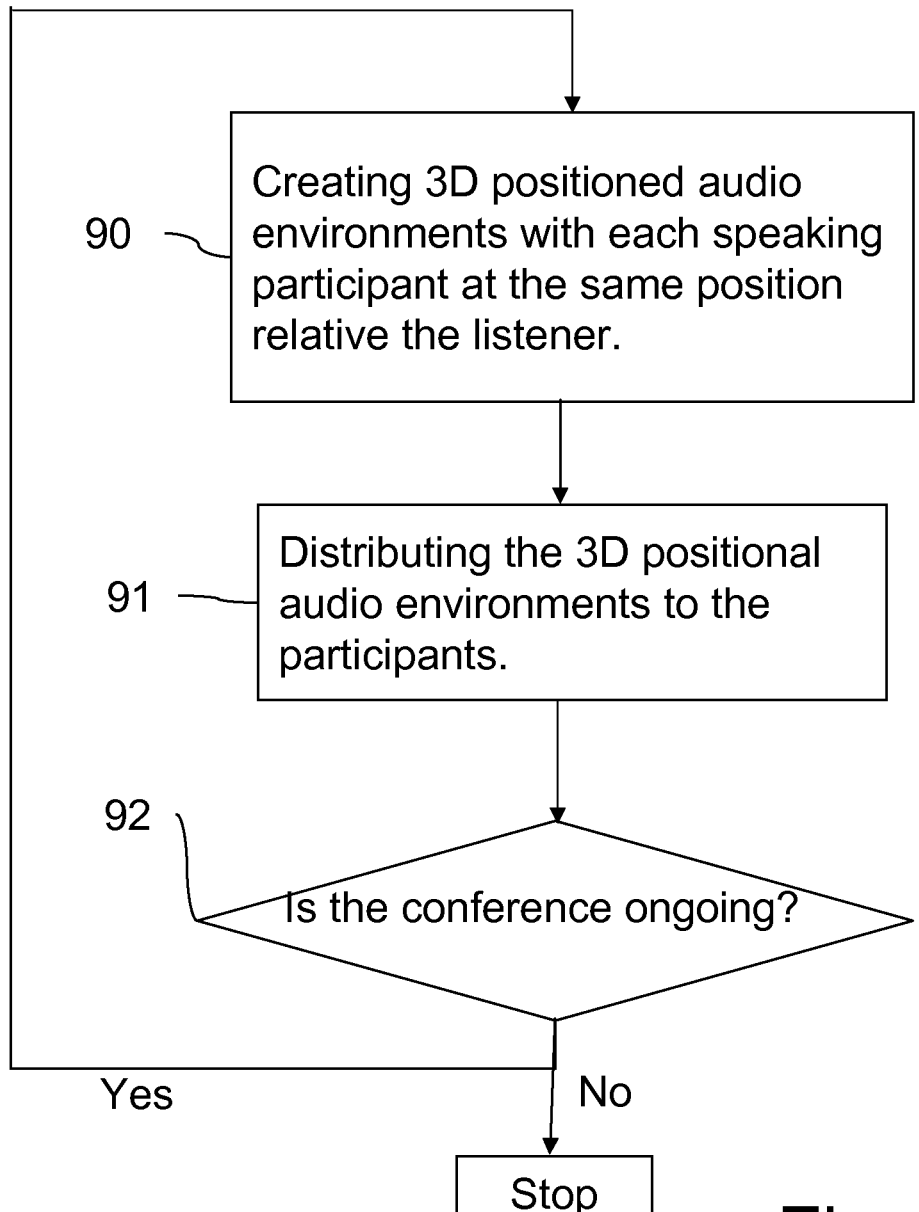
Figure 9B:
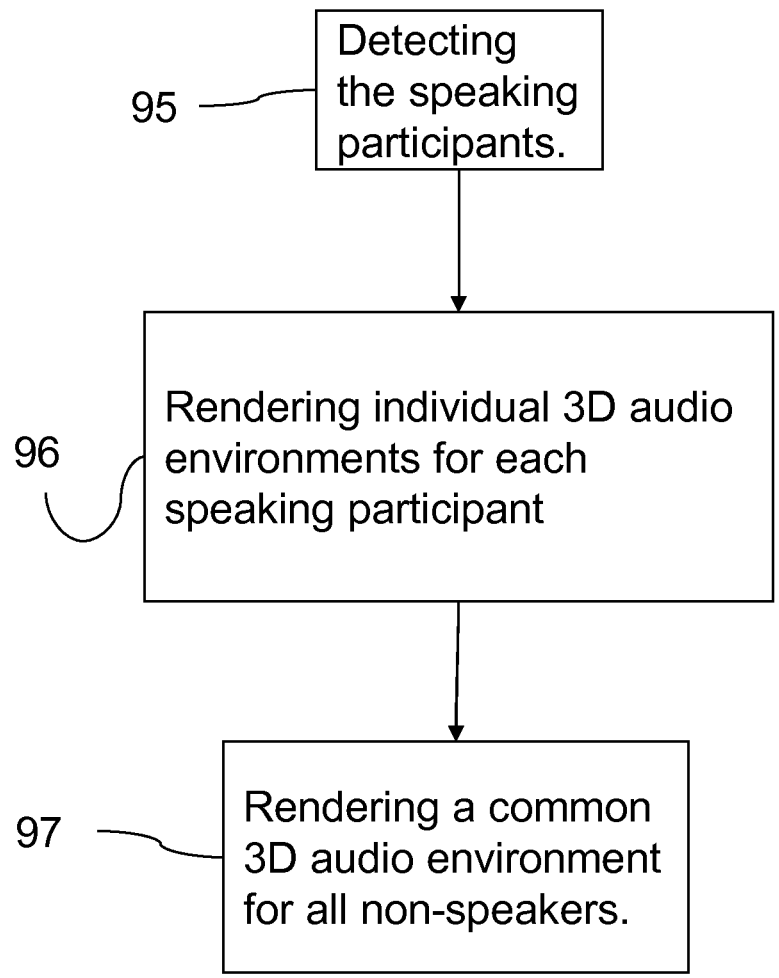
Figure 9C:
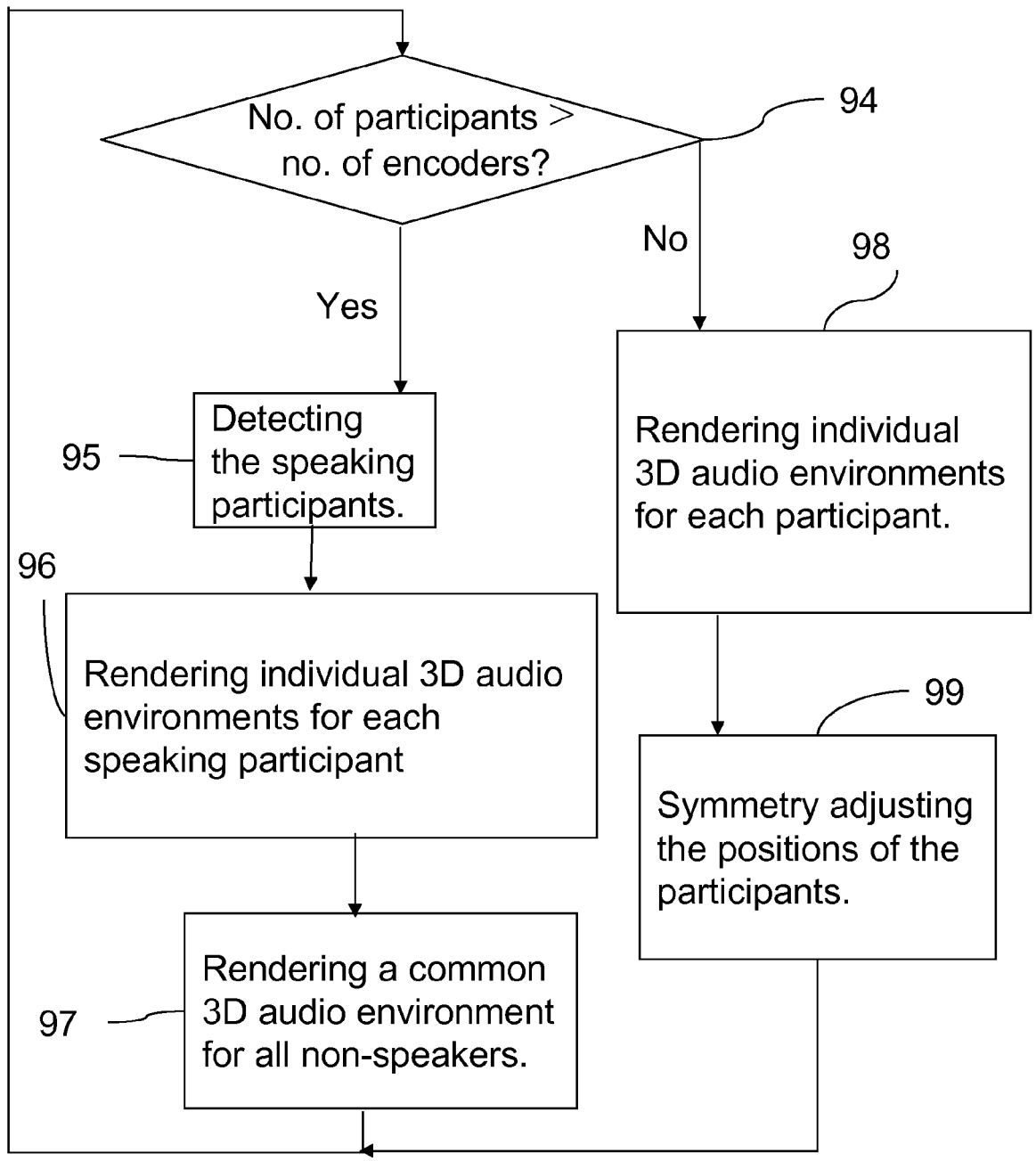
Figure 10A:
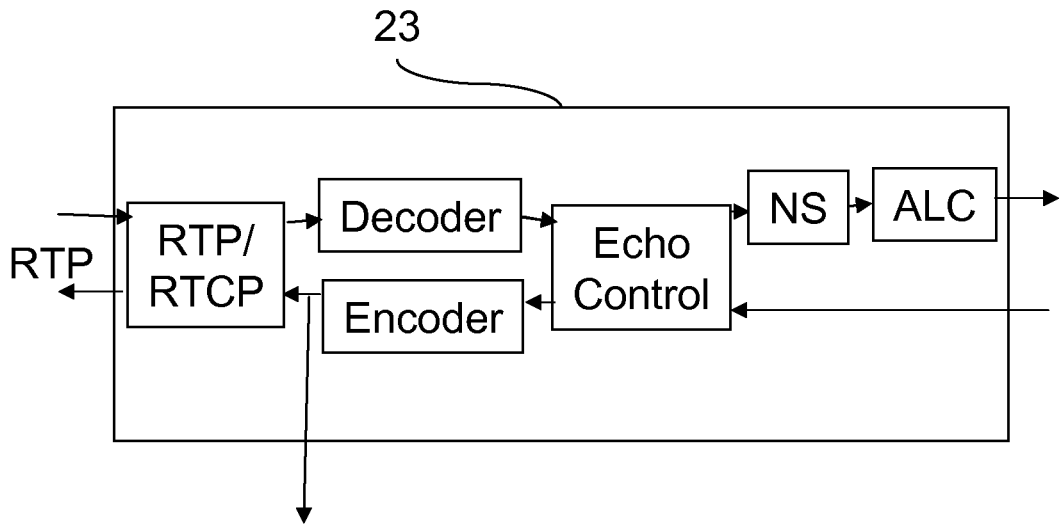
Figure 10B:
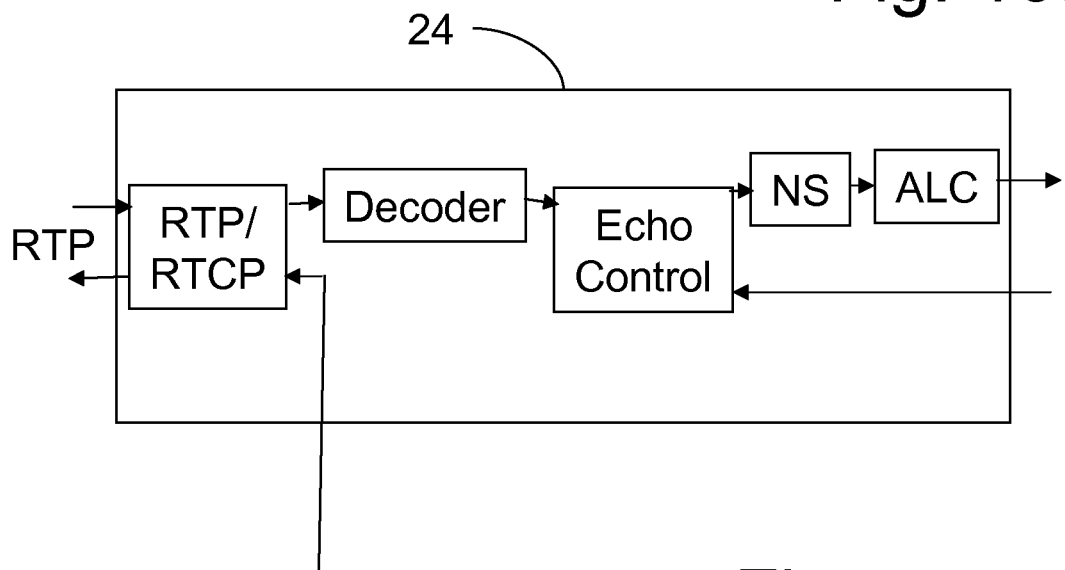
Figure 11:
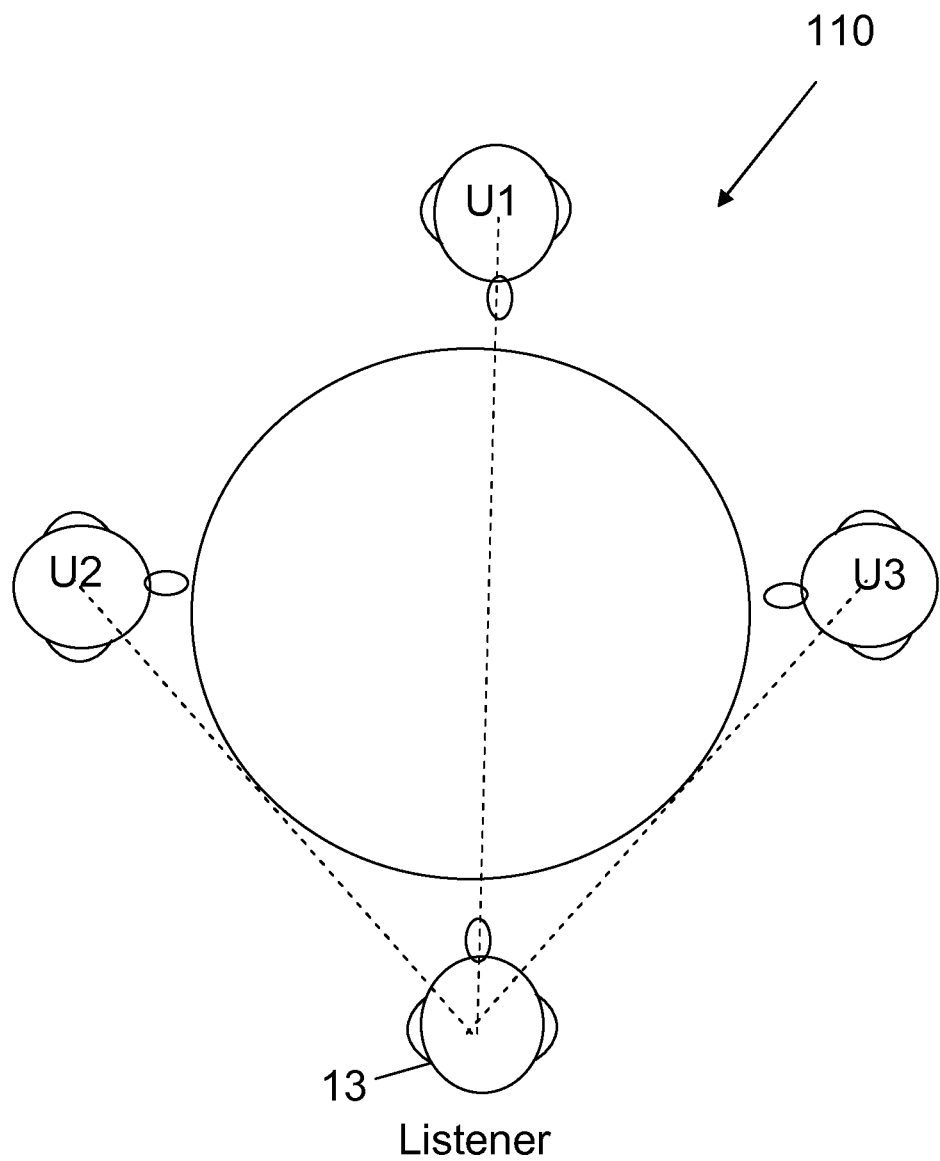
Figure 12:
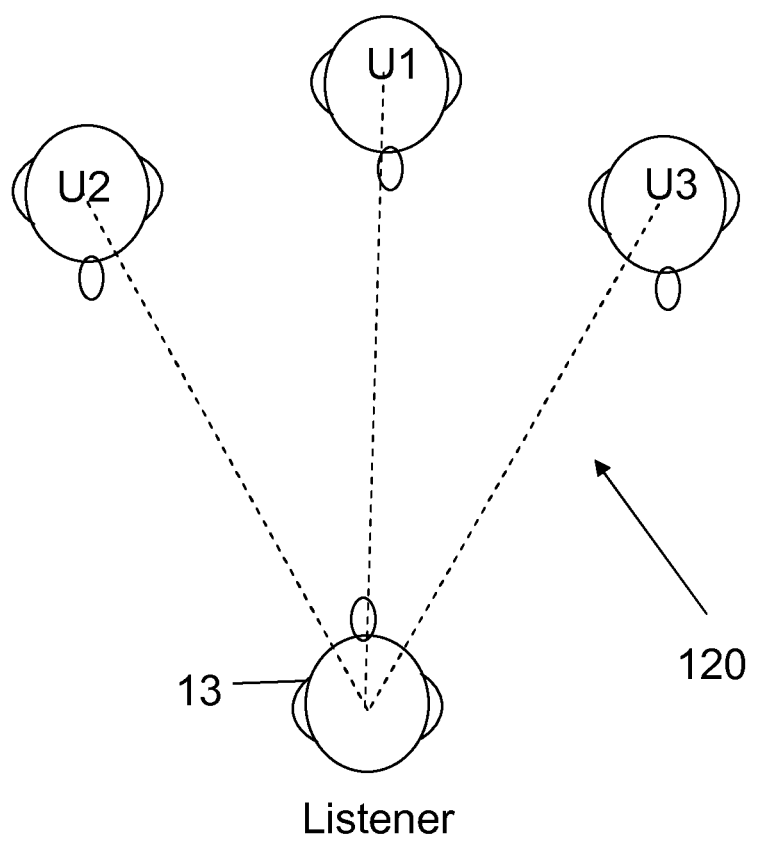
Figure 13A:
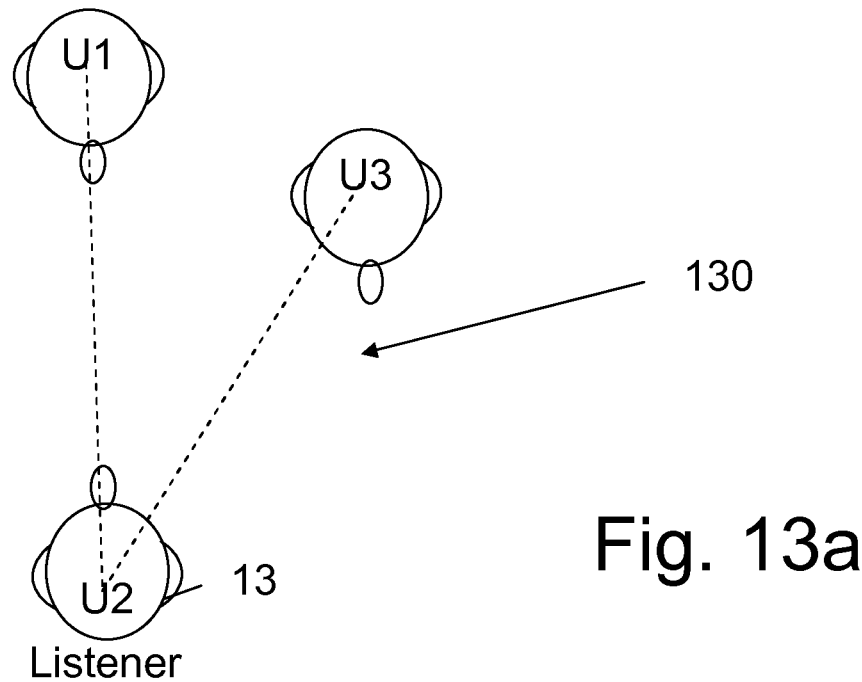
Figure 13B:
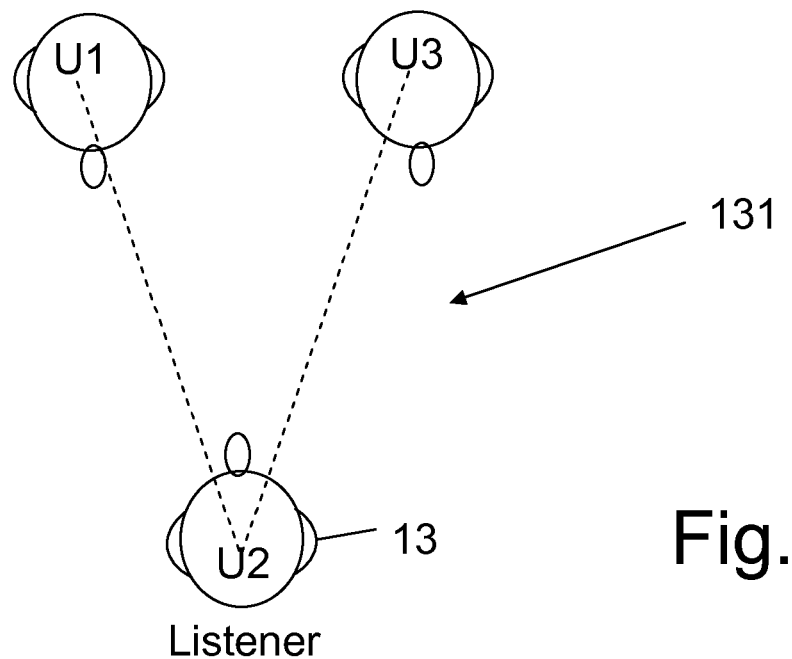

The FIGS. 8a, 8b, 8c and 8d illustrate exemplary 3D audio environments, in which only U1, U3, and U6 are speaking participants;

The FIG. 9a is a flow diagram illustrating the basic concept of this invention;

The FIG. 9b is a flow diagram illustrating a further embodiment of this invention;

The FIG. 9c is a flow diagram illustrating another exemplary embodiment;

The FIGS. 10a and 10b illustrate the user channels according to an embodiment of this invention;

The FIG. 11 illustrates a 3D positional audio environment with only a few participants, The FIG. 12 shows the environment in FIG. 11 transformed into an arc shaped environment;

The FIGS. 13a and 13b illustrates a symmetry adjustment of a 3D positional audio environment.

DETAILED DESCRIPTION

In the following description, specific details are set forth, such as a particular architecture and sequences of steps in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with a programmed microprocessor or a general purpose computer, and/or using an application-specific integrated circuit. Where the invention is described in the form of a method, the invention may also be embodied in a computer program product, as well as in a system comprising a computer processor and a memory, wherein the memory is encoded with one or more programs that may perform the described functions.

One or more embodiments herein place the virtual sound source corresponding to each participant at the same spatial position relative the listening participant in every created 3D positional audio environment. The embodiments further create an individual 3d positional audio environment signal only for each speaking participant, and a common 3D positional audio environment for all non-speaking participants, only the speaking participants being included in said created 3D positional audio environments.

Figure 1:
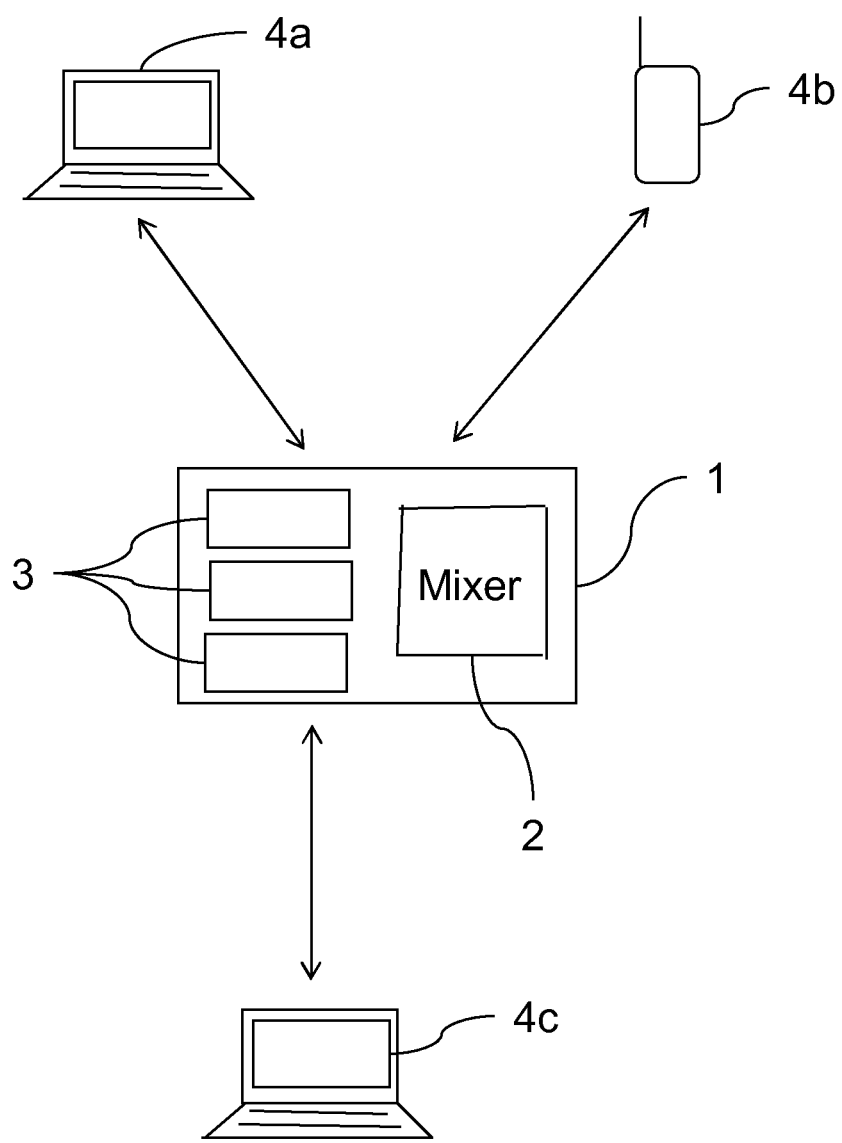

The above-described FIG. 1 shows a conventional conference bridge 1 connected to different types of user terminals 4a, 4b, 4c. The conference bridge, which is further illustrated in the FIG. 3a, is divided into two different types of components, i.e. the user channels 3 handling the specific processing for each individual user terminal 4a, 4b, 4c, and a mixer 2 rendering the virtual audio environments. The user channels 3 perform transport handling, normally RTP/RTCP, decoding/encoding and various types of audio processing, and an exemplary user channel is further illustrated in FIG. 3b.

The exemplary audio processing blocks shown in FIG. 3b includes an echo controlling block for cancelling out echoes that may occur at the user terminal, in case the user terminal is unable to cancel echoes itself. The NS-block, or noise suppression block, is useful if the input signal is noisy, but normally the noise suppression will be handled directly in the user terminal. The ALC-block, or the automatic level controlling block, ensures that all the speech signals have a substantially equal speech level.

The FIG. 4 illustrates an exemplary conventional mixer 2 of a conference bridge, the output of the mixer connected to the input of the user channels, and the output from said user channels connected to the input of the mixer. The input signals 3a, 3b, 3N to the mixer from the user channels may be re-sampled, if required, in the re-sampling units 7a, 7b and 7N to the sampling rates of the user terminal of other participants, and the re-sampled signals are used for 3D audio rendering of the 3D positional audio environment for each participant. The positions of the virtual sound sources in the 3D positional audio environments corresponding to the different participants are controlled by the 3D Audio Scene Manager 9, which optionally may be controlled e.g. by each user terminal.

The drawback with this conventional mixer is that all the participants are 3D audio rendered in the 3D positional audio environment for all other participants, even if they are silent. Normally, only one or a few of the participants are talking at the same time in a conference, and it is not efficient to use the available resources to perform positioning, re-sampling and encoding of a speech signal from a non-speaking participant. Thus, the complexity of a conventional mixer is unnecessary high. Further, in a conventional mixer the complexity of the 3D positional audio rendering will increase exponentially with the number of participants, since an additional individual 3D positional audio environment must be rendered for every new participant, and a new virtual sound source added to all the other 3D positional audio environments.

In order to reduce the complexity, the number of simultaneously 3D audio rendered participants may be restricted in each virtual audio environment. As mentioned above, normally only one or a few of the participants are talking at the same time, and it is sufficient to 3D audio render these actively speaking participants. However, the speech activity has to be detected in order to decide which participants that are talking, and this is e.g. performed by Voice Activity Detectors (VADs).

FIG. 5 illustrates an exemplary mixer according to this invention, the mixer comprising VADs 10a, 10b, 10N, and the positions of the virtual sound sources in the 3D positional audio environments corresponding to the different participants are controlled by the 3D Audio Scene Manager 9. Each of the input signals 3a, 3b, 3N in FIG. 5 is fed to a VAD, and each VAD reports to the Mixing Control unit 11 if speech is detected or not. The Mixing Control unit will in turn inform the mixing units 8a, 8b, 8N and 3D audio rendering units 12a, 12b, 12N for each participant, and only the signals from the speaking participants will be 3D audio rendered and included in the 3D positional audio environment signals. Further, no re-sampling is necessary for the signals from the participants that will not be included in the mixing, and the re-sampling units 7a, 7b, 7N may also be controlled by the mixing control unit 11.

Further, each created 3D positional audio environment signal has to be encoded before transmission to the listening participant, and the encoding requires a lot of resources. In order to decrease the number of encoders, the solution according to this invention involves that the 3D audio scene manager 9 places each participant at the same position relative the listening participant in each created 3D positional audio environment, thereby creating a common virtual scene in all the created audio environments. Additionally, fewer 3D positional audio environment signals are created, i.e. one common for the non-speaking participants and one individual for each of the actively speaking participants, since their own speech has to be excluded. This will lead to a reduction of the encoding, since the number of signals that has to be encoded corresponds to the number of created 3D positional audio environment signals.

The flow diagram in FIG. 9a illustrates the method according to the first embodiment of this invention. In step 90, the conference bridge creates a 3D positional audio environment signal for each participant as a listening participant, placing the virtual sound source corresponding to each participant at the same spatial position relative the listening participant in all the created 3D positional audio environments. In step 91, the conference bridge distributes each created 3D positional audio environment signal to the corresponding listening participant, and in step 92 it is determined if the conference is still ongoing. If no, the process is stopped, otherwise it continues from step 90 again.

The mixing units 8a, 8b, 8N in the conference mixer in FIG. 5 comprises one common mixing unit for the non-speaking participants as listening participants, and a suitable number of mixing units for each speaking participants as a listening participant (thus note that the each participant, whether speaking or not, may be a listening participant for which a 3D positional environment signal is created). The common mixing unit is adapted to include the speech signals of all the speaking participants in the created 3D positional audio environment, and the mixing units for the speaking participants are adapted to include the speech signals of all speaking participants, except the speech signal of the listening participant.

Thus, the flow diagram in FIG. 9b illustrates the method according to a further embodiment of this invention, in which the creation of a 3D positional audio environment for each participant as a listening participant, corresponding to step 90 in FIG. 9a, further comprises the step 95 of detecting the speaking participants, step 96 of rendering individual 3D positional audio environment signals only for each speaking participant, and step 97 of rendering a common 3D audio environment signal for all the non-speaking participants as listening participants.

Accordingly, the particular 3D positional audio environment signal rendered for any given participant may be either an individual signal or a common signal depending on whether that participant is speaking or not. Irrespective of whether the signal is an individual signal or a common signal, though, creation of the signal for the given participant entails rendering the speech of each of one or more other participants as a 3D positioned virtual sound source (excluding the speech of the given participant, if that participant is a speaking participant). Creation then entails placing the source corresponding to each of the other participants at the same spatial position relative the given participant as in every other created 3D positional audio environment signal.

Additionally, according to a further embodiment of this invention, a predetermined maximum number of participants is selected to be 3D audio rendered, in order to limit the number of required 3D audio rendering units and re-sampling units and reduce the memory consumption, and this selection may be based an a detection of the activity level of the speaking participant. When a non-speaking participant becomes active, i.e. a silent person starts talking, this participant may take over the 3D audio rendering unit and the re-sampling unit previously used by another participant that has become passive, i.e. has stopped talking.

FIG. 6a illustrates the virtual positions of the participants in a 3D positional audio environment 60, and FIG. 6b illustrates the positions of FIG. 6a transformed to an arch, and this is the scene all participants will perceive, except that they will not hear themselves.

FIG. 7a shows a scene which is perceived by the participant U1 as a listening participant. The original position of U1 is indicated by a dotted line, since the speech signal from participant U1 will be excluded in the 3D positional audio environment signal created for the U1 as a listening participant. The participant U2 as a listening participant will perceive the scene according to FIG. 7b, in which the speech signal from the participant U2 is excluded.

According to this invention, each participant as a listening participant will perceive the scene from a common listening position, with all other participants at the same spatial positions relative the listening participant in all the created 3D positional audio environments, which is illustrated in the FIGS. 8a-8d, and described below. If only a few of the participants are speaking, or if a predetermined maximum number of selected speaking participants is set to a low number, then the speech signals from only a few of the participants will be 3D audio rendered and included in each created 3D positional audio environment signal. Accordingly, only three of the seven participants are included in the 3D positional audio environments illustrated in the FIGS. 8a-8d, and the other four participants are indicated by a dotted line.

Figure 8A:
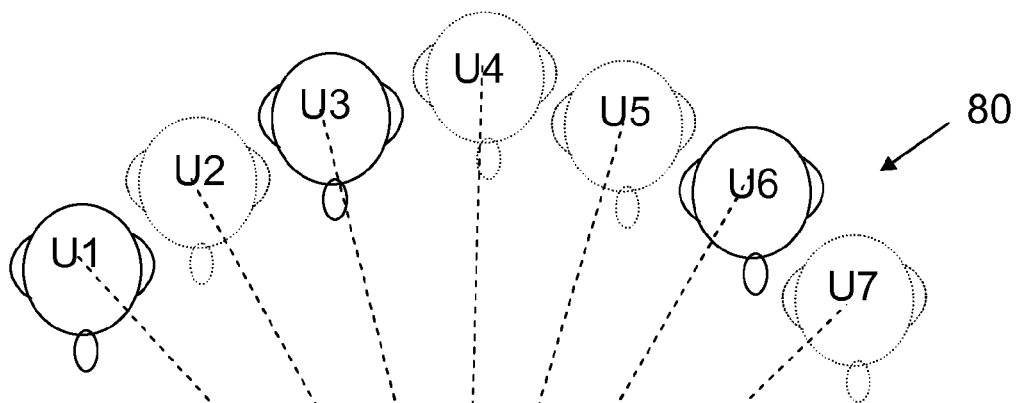

FIG. 8a illustrates a common 3D positional audio environment 80 created for the non-speaking participants, if only the participants U1, U3 and U6 are speaking, or selected as the speaking participants. Only the speech signals from the participants U1, U3 and U6 are 3D audio rendered, and the silent, or non-selected, participants U2, U4, U5 and U7 are indicated by a dotted line in the figure.

Figure 8B:
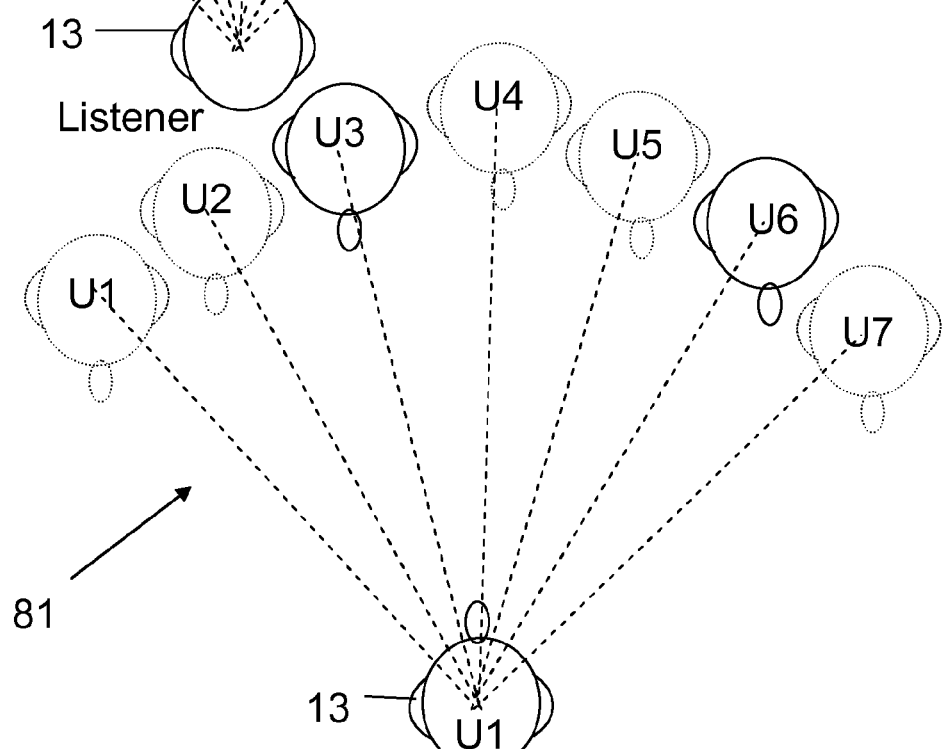

FIG. 8b illustrates the individual 3D positional audio environment 81 created for the speaking participant U1 as a listening participant 13, in which the speech signal from U1 is excluded. The silent, or non-selected, participants U2, U4, U5 and U7 are indicated by a dotted line in the figure, as well as the listening participant U1, since only the speech signal from U3 and U6 are 3D audio rendered.

Figure 8C:
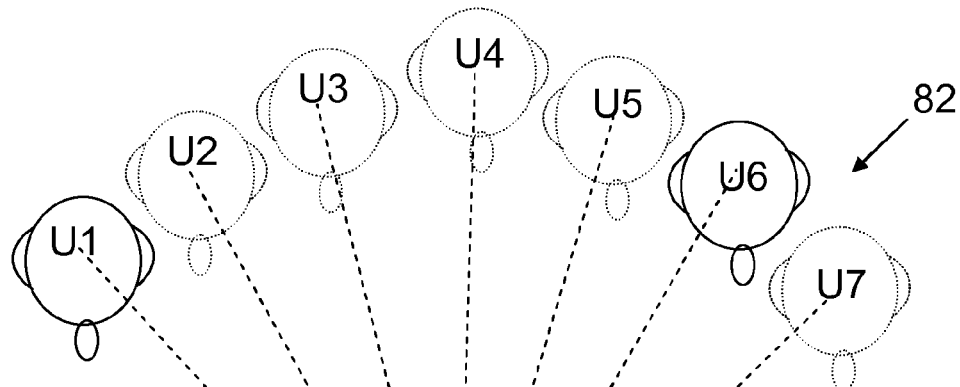

FIG. 8c illustrates the individual 3D positional audio environment 82 created for the speaking participant U3 as a listening participant 13, in which the speech signal from U3 is excluded. The silent, or non-selected, participants U2, U4, U5 and U7 are indicated by a dotted line in the figure, as well as the listening participant U3, since only the speech signal from U1 and U6 are 3D audio rendered.

Figure 8D:
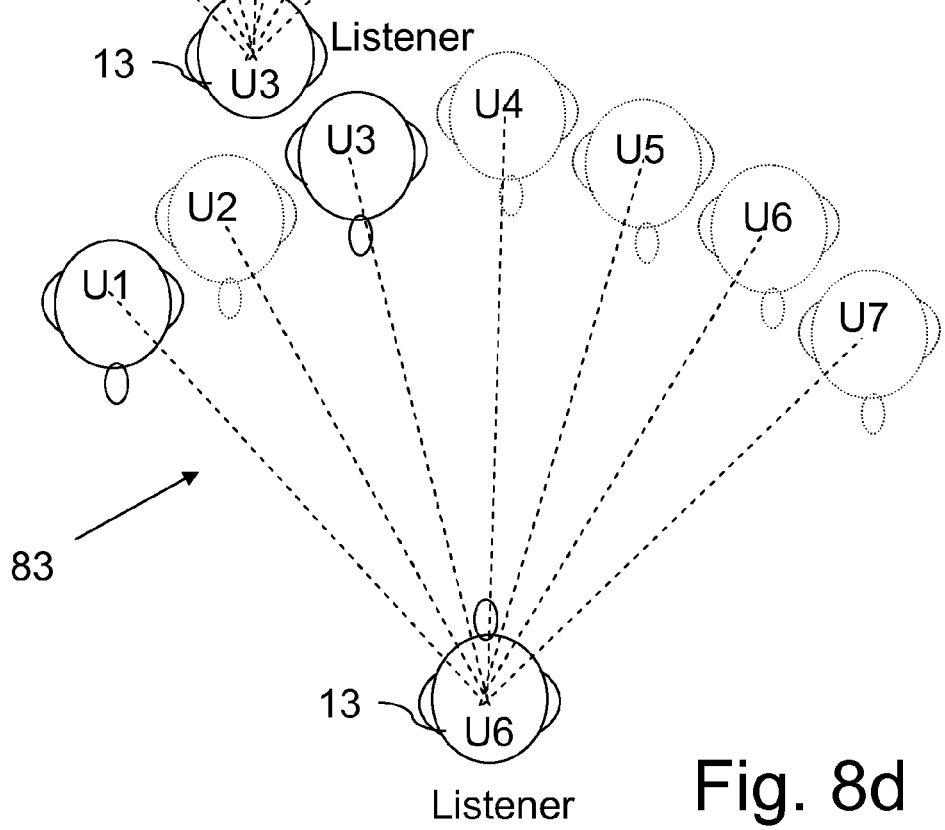

Finally, FIG. 8d illustrates the individual 3D positional audio environment 83 created for the speaking participant U6 as a listening participant 13, in which the speech signal from U6 is excluded. The silent, or non-selected, participants U2, U4, U5 and U7 are indicated by a dotted line in the figure, as well as the listening participant U6, since only the speech signal from U1 and U3 are 3D audio rendered.

Thus, if all the participants use the same codec and sampling rate, only four different 3D positional audio environment signals have to be encoded, i.e. one signal according to each of the FIGS. 8a-8d, as compared to seven different 3D positional audio environment signals in a conventional solution, in which individual 3D positional audio environment would be created for each of U1, U2, U3, U4, U5, U6 and U7. Further, since each participant is located at the same position relative the listening participant in all the four 3D positional audio environments, as illustrated in the FIGS. 8a, 8b, 8c and 8d, a virtual sound source only has to be 3D audio rendered once for each speaking participant, and the resulting signal can be used in all the created 3D positional audio environment signals. Thereby, the computational cost of the 3D audio rendering will be reduced considerably, and the reduction is even larger if the number of participants is higher. If the number of participants increases, then more participants will receive the bit-stream corresponding to the common 3D positional audio environment created for the non-speaking participants.

For participants having user terminals with different codecs and/or different sampling rates, the solution according to this invention may be less advantageous, since the rendering of the 3D positional audio environments has to be performed at respective sampling frequency and then encoded by the respective encoder type. However, normally at least some of the participants will use the same codec and sampling frequency. When a new participant calls in to the conference, negotiations will be performed regarding the codec and the sampling frequency, and preferably the conference bridge will make sure that as few codecs as possible will be used.

When the same 3D positional audio environment has to be rendered at several different sampling rates, i.e. the participants require audio with different sampling frequencies, then the cost of the 3D audio rendering may be reduced by performing the rendering of the common 3D positional audio environment for the non-speaking participants at the highest sampling frequency, and down-sampling the resulting signal to all other sampling frequencies before encoding.

Accordingly, the outputs of respective mixing unit 8a, 8b, 8N in the conference mixer shown in FIG. 5 must be encoded and directed to the right participant. The individual output signals for each speaking participants as listening participants will be directed to corresponding user channel, but according to a further embodiment of this invention, the common output signal for the non-speaking participants is only directed to the user channel of the first non-speaking participant, and when the sound signal has been encoded, the encoded bit-stream will be directed to the user channels of all the other non-speaking participants, without any further processing.

The FIG. 10a shows a first user channel 23 for a non-speaking participant, and the user channel encodes the signal and re-directs the encoded bit-stream to the other non-speaking participants, according to the above-described embodiment. FIG. 10b illustrates a second user channel 24 of the other non-speaking participants. This second user channel does not include any encoder, and the user channel receives the encoded bit-stream from the first non-speaking participant that performed encoding. However, if the first non-speaking participant either becomes active or leaves the conference, then this second user channel may have to perform the encoding and distributing of the encoded bit-stream to the user channels of the other non-speaking participants. Thus, a user channel must be able to switch between the two cases shown in FIGS. 10a and 10b, respectively, and this can be achieved either by all user channels having encoders that can be enabled or disabled, or by the conference bridge supplying a number of encoders that can be incorporated in the user channels where needed. The second alternative, that the conference bridge supplies a number of encoders to be incorporated in a user channel, is preferred, since memory for different encoder states does not have to be allocated in each user channel. Further, if a user channel becomes the one who should perform encoding of the passive bit-stream, the encoder used by the user channel previously performing the encoding will be available, and may be incorporated in the new user channel. Since the encoder state is correct, i.e. it encoded the last frame of the passive signal, the change of the user channel performing the passive encoding will go smoothly. However, if the non-speaking participants use more than one type of codec and/or sampling frequency, then several user channels, i.e. one for each codec and sampling frequency, will perform the encoding of the signal representing the common 3D positional audio environment signal.

When a participant switches from a passive state to an active state, i.e. becomes a speaking participant, then the participant will receive its own individual 3D positional audio environment signal and has to encode it. The encoder to be used by the new speaking participant is released from a participant that switches from an active state to a passive state, i.e. becomes a non-speaking participant. An encoder state from a previously speaking participant is not adapted to the new speaking participant, since the previous frame for the previously speaking participant probably differed from the previous frame that the new speaking participant decoded and played. Encoding and decoding normally depends on the previous frame, and it is very common to code the change of different parameters instead of the absolute values. Hence, in order to achieve a smooth transition for the new speaking participant, the encoder must get the state for the previous frame of the encoder of the common 3D positional audio environment copied to its own state.

When a participant switches from an active to a passive state, i.e. becomes a non-speaking participant, the participant will lose its own encoder and instead receive the bit-stream of the common 3D positional audio environment. If the audio streams of the common 3D positional audio environment and the individual 3D positional audio environment are identical before the switch, this will not create any problems and the transition will go smoothly. Since the mixer has decided that the participant is silent, the only difference between the two audio streams should normally be the background noise. However, if the two audio streams differ, the switch of the bit-streams may give rise to audible artifacts, since the state of the decoder is not suitable for the new bit-stream. The solution according to a further embodiment of this invention is to first feed the encoder of the new silent participant with one or more frames of the common, passive audio stream before switching, since this will allow the decoder to adjust to the passive bit-stream. Thereafter, the encoder can be released and the passive bit-stream transmitted to the user terminal of the new silent participant, resulting in a smooth transition. A drawback is that the encoder is occupied, and cannot be used by the new speaking participant, which means that the new speaking participant must receive the common bit-stream until the encoder has been released. This problem may be solved by having one or more extra encoders that may be used by new speaking participants during a transition period.

When a new participant joins the conference, the decoder of the user terminal is in a reset state, and is only adapted for a bit-stream created by an encoder with a reset state. If the newly added participant is determined to be non-speaking, then the decoder of the user terminal will receive the common bit-stream created for the non-speaking participants. Since the decoder is in a reset state, the decoded sound signal will not be identical to the common sound signal for non-speaking participants, if the codec relies on a coding that depends on the previous frame. However, normally a decoded signal will start with zero amplitude and increase the amplitude for each frame, and the signal attributes will eventually become more similar to the attributes of the common sound signal for the non-speaking participants, i.e. the signal is "faded in".

If the newly added participant is determined to be an actively speaking participant, an encoder will be dedicated to the user channel of the new participant. In this case, the state of the encoder should be reset, and since the decoder has a reset state as well, the encoded bit-stream will be adapted to the decoder.

The concept of this invention that each speaking participant is placed at the same spatial position relative the listening participant in all the created 3D positional audio environments will reduce the computational complexity. However, this may be less advantageous when only a few participants are connected to the conference, which is illustrated in FIG. 11. In the audio environment 110 according to FIG. 11, the three participants U1, U2 and U3 are positioned around a table, and the participants U2 and U3 will have unsymmetrical scenes from the listening position 13, with one talker positioned straight ahead, and another at 45 degrees to the side. The FIG. 12 illustrates the virtual sound sources positioned in an arch shape, and the scene will still be unsymmetrical for U2 and U3, as illustrated in FIG. 13a.

If additional participants join the conference, the asymmetry will decrease, but with only three participants, the scene perceived by the participants U2 and U3 will be asymmetric. However, if the conference bridge allows three or more encoders to be used simultaneously, then an individual 3D positional audio environment may be created for each participant as a listening participant. Thereby, the created 3D positional audio environments may be modified, i.e. symmetry adjusted, for each participant in order to achieve symmetric scenes for all the participants as listening participants.

Thus, according to a further embodiment of this invention, an individual 3D positional audio environment is created for each participant as a listening participant, in case the number of participants does not exceed the number of available encoders, and the virtual spatial positions in said created 3D positional audio environments are adjusted to be symmetric relative the listening participant. This is illustrated in the FIGS. 13a and 13b, showing the scene perceived by participant U2 as a listening participant before and after a symmetry adjustment. This embodiment is also illustrated in the flow diagram in FIG. 9c, which includes the steps according to FIG. 9b, with the additional step 94 determining whether the number of participants exceeds the number of available encoders. If yes, then the steps 95, 96 and 97, according to FIG. 9b is performed. However, if not, then individual 3D audio environment are created for each of the participants, in step 98, and the positions of the participants relative the listener are symmetry adjusted, in step 99.

When additional participants join the conference, such that the numbers of participants again exceed the number of available encoders, then a common 3D audio environment will be re-created for all non-speaking participants. If the number of created individual 3D audio environments is equal to the number of available encoders, then one of the participants will abruptly be switched to the common 3D positional audio environment when a new participant joins the conference, since the encoder is needed for encoding the common 3D positional audio environment signal. Further, if the individual 3D positional audio environment has been symmetry adjusted, then this participant may experience an abrupt movement of the virtual sound sources. Therefore, according to another embodiment or this invention, an extra encoder is available for encoding a common 3D positional audio environment signal, in case a new participant joins the conference. According to a still further embodiment, when the conference bridge starts creating said common 3D positional audio environment, the positions of the virtual sound sources in the individual 3D positional audio environments will be adjusted to correspond to the positions of the virtual sound sources in the common 3D positional audio environment, since a newly added participant may be selected as a speaking participant and one of the participants with an individual 3D environment may be selected as non-speaking. If this adjustment is completed before the switch, the participants will experience a smoother change of the positions of the virtual sound sources.

By creating a common 3D positional audio environment that all silent participants will hear and only create individual 3D positional audio environments for the actively speaking participants, the cost of creating and encoding of the 3D environments will be constantly low irrespective of the number of participants in the conference. Further, by placing the participants with the same position relative the listening participant in all the 3D positional audio environments, each speaking participant only has to be 3D audio rendered once, and the resulting signal can be used in several 3D positional audio environments, thereby reducing the computational complexity. The complexity is further reduced by not re-sampling and 3D audio rendering the speech signals of the silent, or non-selected, participants.

To create individual 3D positional audio environments for all the participants, when only few participants are connected to a meeting, will enable a symmetry adjustment of the scene, and the audio scene will be perceived as more pleasant by the listening participant, as compared to an asymmetric scene.

Further, by setting the initial encoder state differently depending on the state of the participant will result in a smooth bit-stream switch, without any audible artifacts.

While the invention has been described with reference to specific exemplary embodiments, the description is in general only intended to illustrate the inventive concept and should not be taken as limiting the scope of the invention.

The invention claimed is:

1. A method implemented by a conference bridge for managing an audio scene comprising two or more participants, the participants using the same codec or different codecs, the method comprising:
   continuously detecting which of the participants are speaking participants and which of the participants are non-speaking participants, by using voice detection on an input signal received from each participant,
   continuously creating a 3D positional audio environment signal for each participant, including an individual 3D positional audio environment signal for each speaking participant and a common 3D positional audio environment signal for all non-speaking participants, by:
      rendering the speech of each of one or more other participants as a 3D positioned virtual sound source, excluding the speech of said participant if said participant is a speaking participant, and
      placing the 3D positioned virtual sound source corresponding to each of the one or more other participants at the same spatial position relative said participant as in every other created 3D positional audio environment signal,
   continuously distributing each created 3D positional audio environment signal to the corresponding participant, and
   encoding the common 3D positional audio environment signal only once for each codec used by the non-speaking participants.

2. The method of claim 1, wherein said placing comprises placing the one or more 3D positioned virtual sound sources to form an arc-shape.

3. The method of claim 1, wherein a predetermined maximum number of speaking participants are selected from said detected speaking participants.

4. The method of claim 3, wherein only the speech from said selected speaking participants are rendered as 3D positioned virtual sound sources.

5. The method of claim 3, wherein only the speech from said selected speaking participants are re-sampled, if a re-sampling to a different sampling rate is required.

6. The method of claim 1, further comprising separately encoding each of said individual 3D positional audio environment signals.

7. A method implemented by a conference bridge for managing an audio scene comprising two or more participants, the method comprising:
   rendering 3D positional audio environment signals that are individualized for speaking participants to respectively exclude the speech of those participants and one 3D positional audio environment signal that is common to all non-speaking participants, wherein rendering different 3D positional audio environment signals comprises placing virtual sound sources for speaking participants at the same spatial positions relative the respective participants for which those signals are rendered; and
   distributing the common 3D positional audio environment signal to a common encoder that encodes the signal for non-speaking participants using the same codec.

8. A conference bridge for managing an audio scene comprising two or more participants, the participants using the same codec or different codecs, the conference bridge comprising:
- a number of user channels, each corresponding to one of said participants;
- a mixer comprising:
    - a voice detector connected to each user channel and configured to detect which of the participants are speaking participants and which of the participants are non-speaking participants,
    - mixing units configured to create a 3D positional audio environment signal for each participant, including a number of individual mixing units configured to render an individual 3D positioned audio environment signal for each speaking participant and a common mixing unit configured to render a common 3D positional audio environment signal for all non-speaking participants, each mixing unit configured to create a 3D positional audio environment signal for a participant by:
        - rendering the speech of each of one or more other participants as a 3D positioned virtual sound source, excluding the speech of said participant if said participant is a speaking participant, and
        - placing the virtual sound source corresponding to each of the one or more other participants at the same spatial position relative said participant as in every other 3D positional audio environment signal, and
    - a mixing control unit configured to control said mixing units, wherein the conference bridge is configured to distribute each created 3D positional audio environment signal to the user channel of the corresponding participant, and wherein the user channels are configured to encode the common 3D positional audio environment signal only once for each codec used by the participants.

9. The conference bridge of claim 8, wherein the mixer is configured to select a predetermined maximum number of speaking participants.

10. The conference bridge of claim 9, wherein a mixing unit is configured to render only the speech of said selected speaking participants as 3D positioned virtual sound sources.

11. The conference bridge of claim 9, wherein the mixer further comprises re-sampling units configured to re-sample only the speech of said selected speaking participants, if re-sampling is required.

12. The conference bridge of claim 9, wherein each user channel is configured to encode each rendered individual 3D positional audio environment signal.

* * * * *